Figure 5:
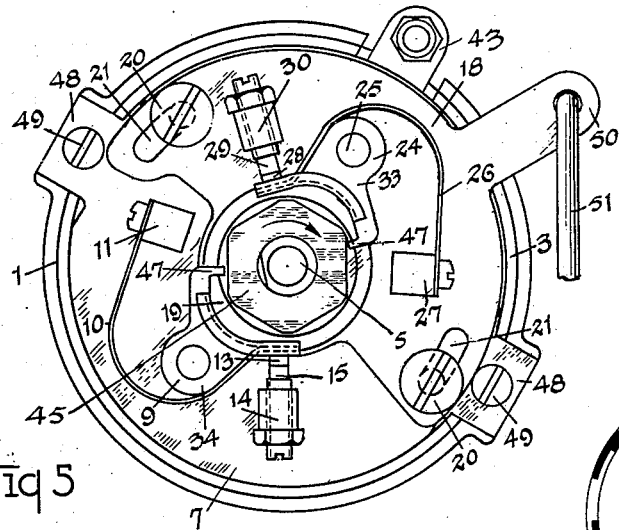

Nov. 8, 1932.                M. MALLORY                1,886,566
                            IGNITION TIMER
                    Filed Nov. 20, 1929         7 Sheets-Sheet 1
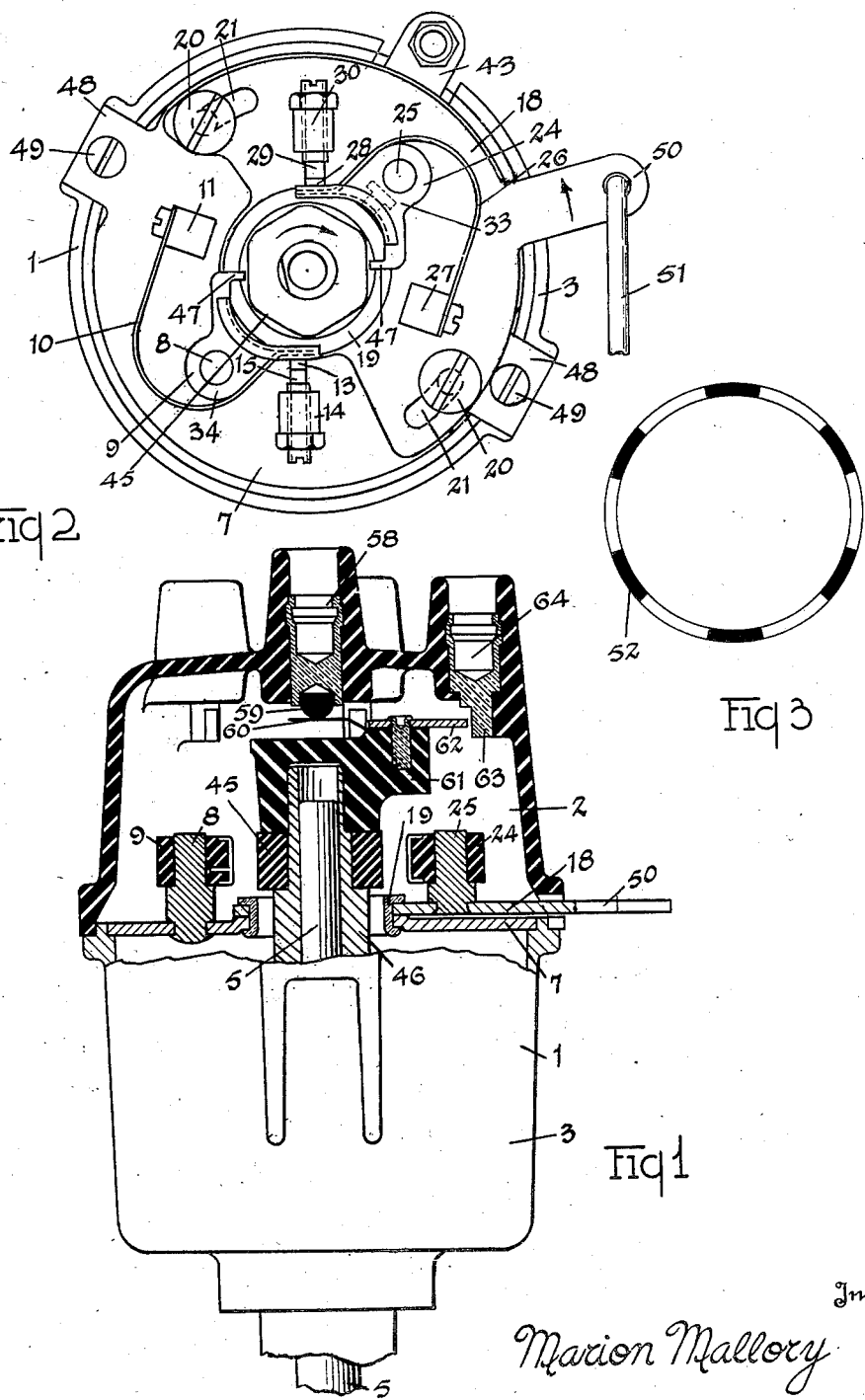
Inventor
Marion Mallory
By Forest F. Crampton
Attorney Nov. 8, 1932.  M. MALLORY  1,886,566
IGNITION TIMER
Filed Nov. 20, 1929  7 Sheets-Sheet 2

Inventor
Marion Mallory
By *[signature]*
Attorney

Nov. 8, 1932. M. MALLORY 1,886,566
IGNITION TIMER
Filed Nov. 20, 1929 7 Sheets-Sheet 3
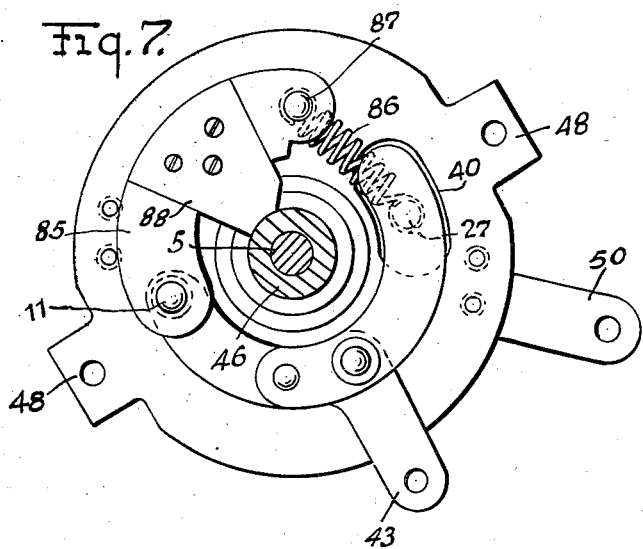
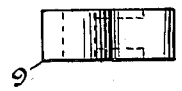
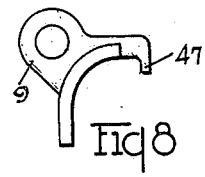
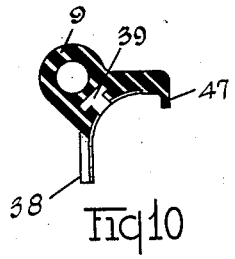
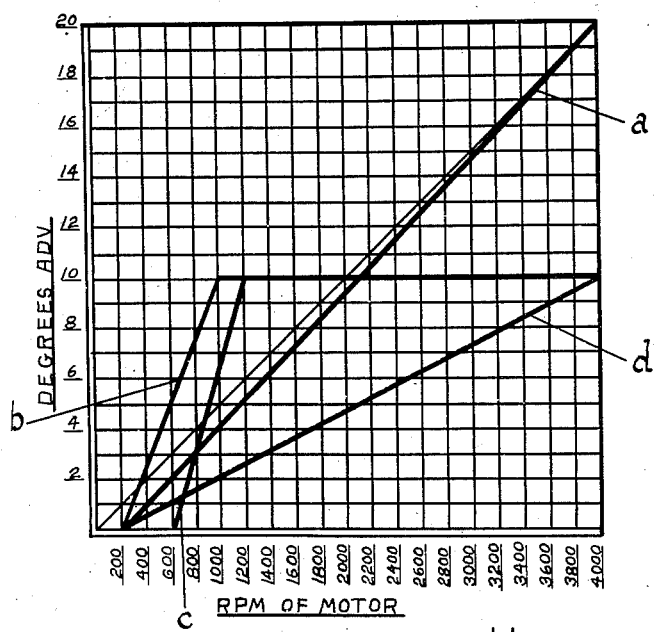
Inventor
Marion Mallory
Attorney Inventor
Marion Mallory Nov. 8, 1932.  M. MALLORY  1,886,566
IGNITION TIMER
Filed Nov. 20, 1929   7 Sheets-Sheet 6

Inventor
Marion Mallory
By Faust F. Crampton
Attorney

Nov. 8, 1932.  M. MALLORY  1,886,566
IGNITION TIMER
Filed Nov. 20, 1929  7 Sheets-Sheet 7
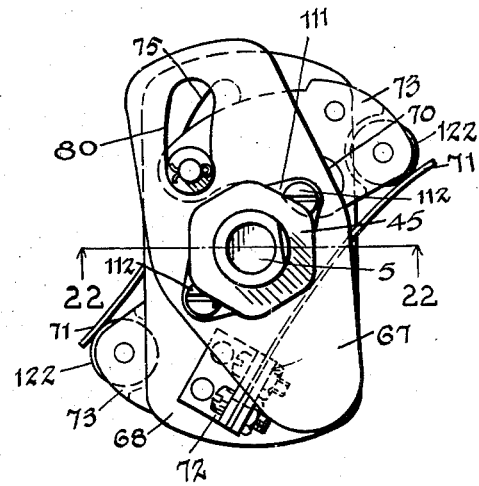
Fig. 20
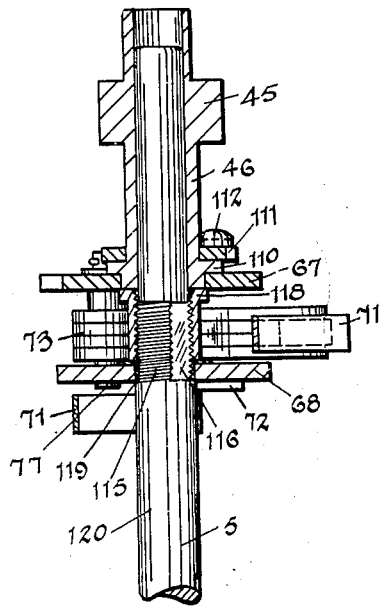
Fig. 22
Fig. 21.
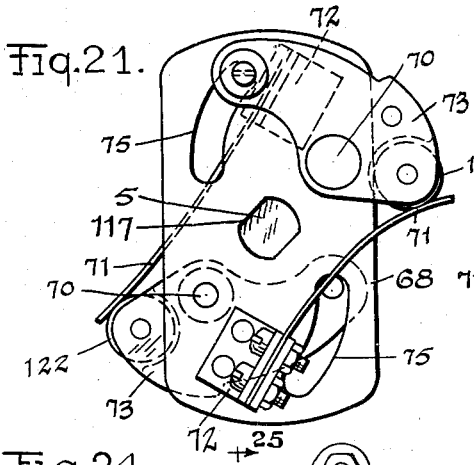
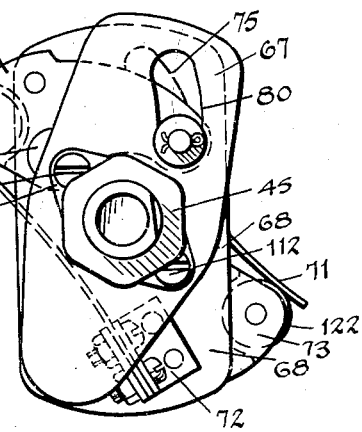
Fig. 23
Fig. 24.
Inventor
Marion Mallory
By Faust F. Crampton
Attorney Patented Nov. 8, 1932

1,886,566

UNITED STATES PATENT OFFICE

MARION MALLORY, OF TOLEDO, OHIO, ASSIGNOR TO THE MALLORY RESEARCH COMPANY, A CORPORATION OF DELAWARE

IGNITION TIMER

Application filed November 20, 1929. Serial No. 408,612.

My invention provides an efficient ignition timer for engines which is so constructed that it will, with exactness, vary the contact period and cause ignition at points in the engine cycle that will produce the most efficient engine operations under variable loads and varying speeds of the engine. The invention provides a means for producing a desired extension of the closure period of the ignition circuit to obtain the production of the required field saturation of an induction coil and also an ignition point dependent upon the characteristics of the engine which is largely determined in its design according to the character of the work that it is to perform, such as, for example, according to whether it is an aeroplane motor, automobile motor, or bus motor, etc.

The invention provides an ignition timer having a centrifugally operated governor that actuates a circuit controlling means, the governor having parts, operated by the centrifugal mechanism of the governor, that control the desired change in the circuit closing periods independent of the extent of movement of the centrifugal mechanism of the governor. Thus, by my invention, parts may be designed according to the characteristics of the engine in connection with which the governor is to be used to obtain the desired changes in the primary circuit closure period and the advancement or retardation of the points of the ignition in the cycle of the operations of the engine.

The invention also provides a means for increasing the closure period of the primary circuit and causing at the same time the retardation of the spark when the throttle valve of the engine is opened during the high compression in the engine, which enables the engine to operate most efficiently when the throttle is quickly opened while the speed of the engine is not high.

The invention also provides a structure that is adaptable to engine cam shaft constructions of different forms and which are connected to operate in either direction, that is, clockwise or counter-clockwise, and, moreover, is so constructed that its automatic responsiveness may be adjusted according to the conditions of the electric system that may be associated with the ignition circuit of the engine and which may vary, such as, during day and night driving, or engine starting, and also according to the relation between the timer shaft and the circuit closing means and according to the direction of rotation of the timer shaft.

Also, the timer may be controlled in conjunction with the carburetor to obtain the required adjustment of the circuit closure periods and points of ignition, according to the introduction of the fuel into the engine. When the throttle of the carburetor is open, a change in the fuel mixture is produced. This change requires a greater ignition current in order to produce a higher ignition temperature to insure an efficient ignition of the fuel mixture. My invention provides a means for controlling the length of the period of closure of the primary of the induction coil of the ignition circuit according to the operation of the throttle valve in order to produce the most efficient ignition current according to the rate of introduction of fuel into the engine. Where the change in speed has been produced in response to opening of the throttle valve, the throttle valve is, ordinarily, manipulated to reduce its effective open area, otherwise the speed of the engine will ordinarily continue to increase. Consequently, my invention produces a means for controlling the length of periods of closure of the primary circuit in accordance with the character and the quantity of the fuel mixture.

In the ordinary ignition system, long circuit closing periods are required at both low and high speeds of the engine in order that the circuit closing period may be sufficiently long to produce the required saturation of the core of the primary coil to enable the production of a hot spark when the primary circuit is opened. The long primary circuit closure periods during all speeds of the engine causes contact burning, particularly when the engine is running at low speeds.

The invention provides a means for causing the spark timing of the engine in its retardation to precede the compression of the engine. Thus, upon reduction of compression, the ignition timing of the engine is automatically advanced and, before increase of the compression, the ignition timing is retarded. When, therefore, the throttle is opened, the ignition points in the cycle of the engine are retarded. As the engine speeds up in response to the opening of the throttle, the compression falls off and the ignition timing is advanced while the length of circuit closure periods and supply of fuel accords to the speed of the engine under the particular load it is carrying.

The invention may be contained in ignition timers that vary in their details of construction and, to illustrate a practical application of the invention, I have selected an ignition timer as an example of the various forms of timers that embody my invention and shall describe it hereinafter. The invention has for its object other advantages and features which will appear from the following description and upon examination of the drawings. The ignition timer selected is shown in the accompanying drawings.

Figure 6:
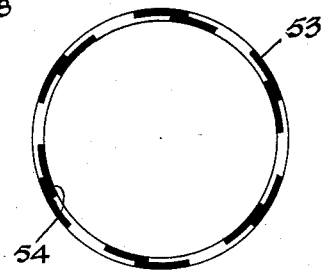
Figure 4:
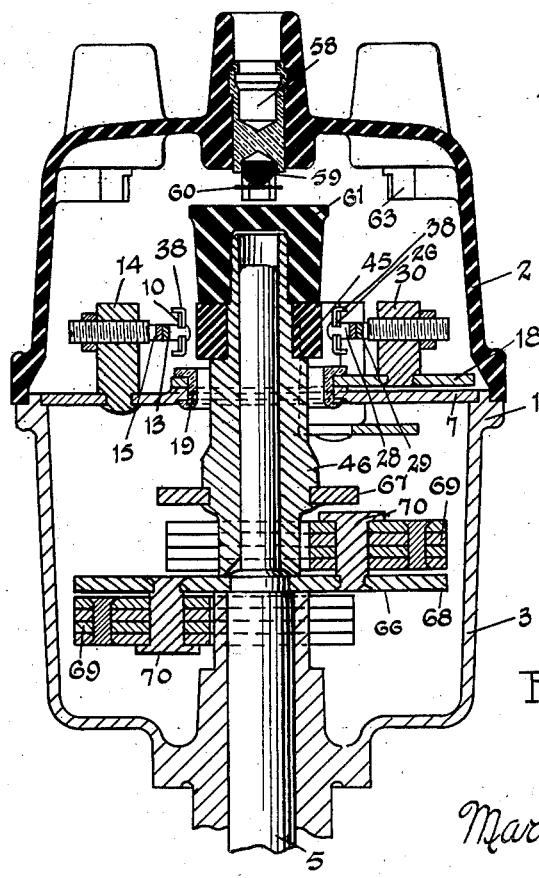
Figure 12:
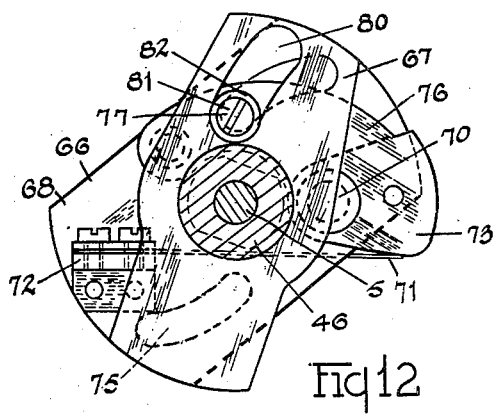
Figure 15:
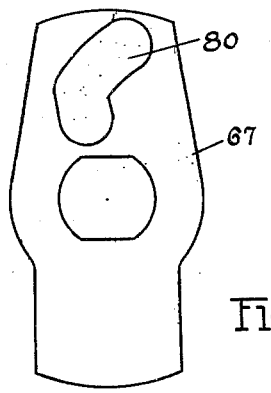
Figure 13:
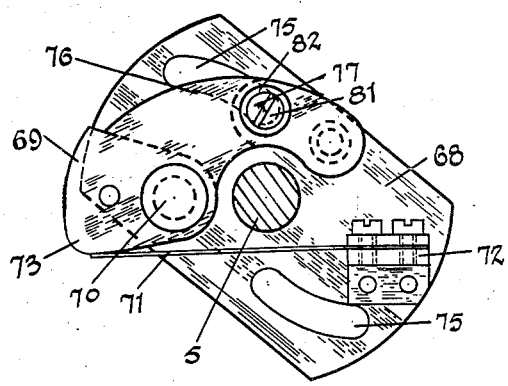
Figure 16:
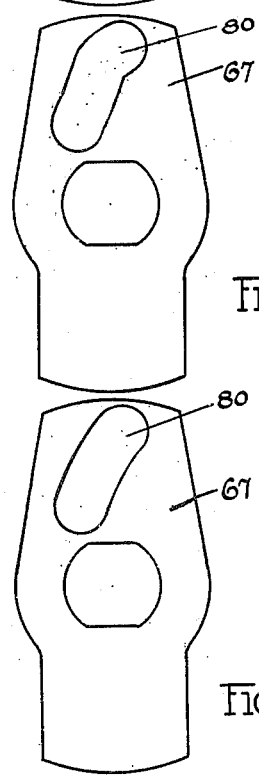
Figure 14:
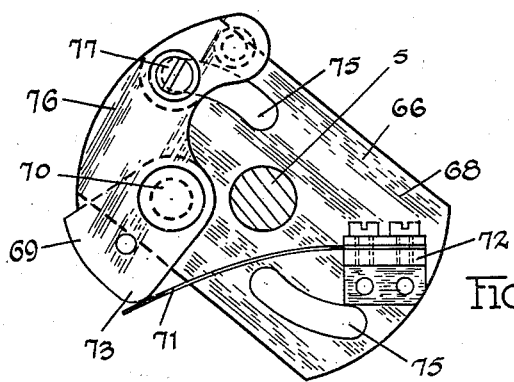
Figure 17:
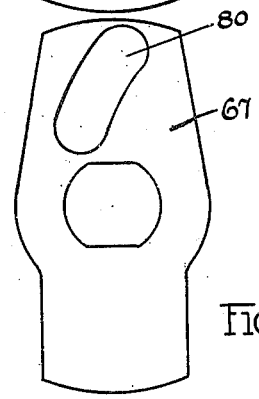
Figure 18:
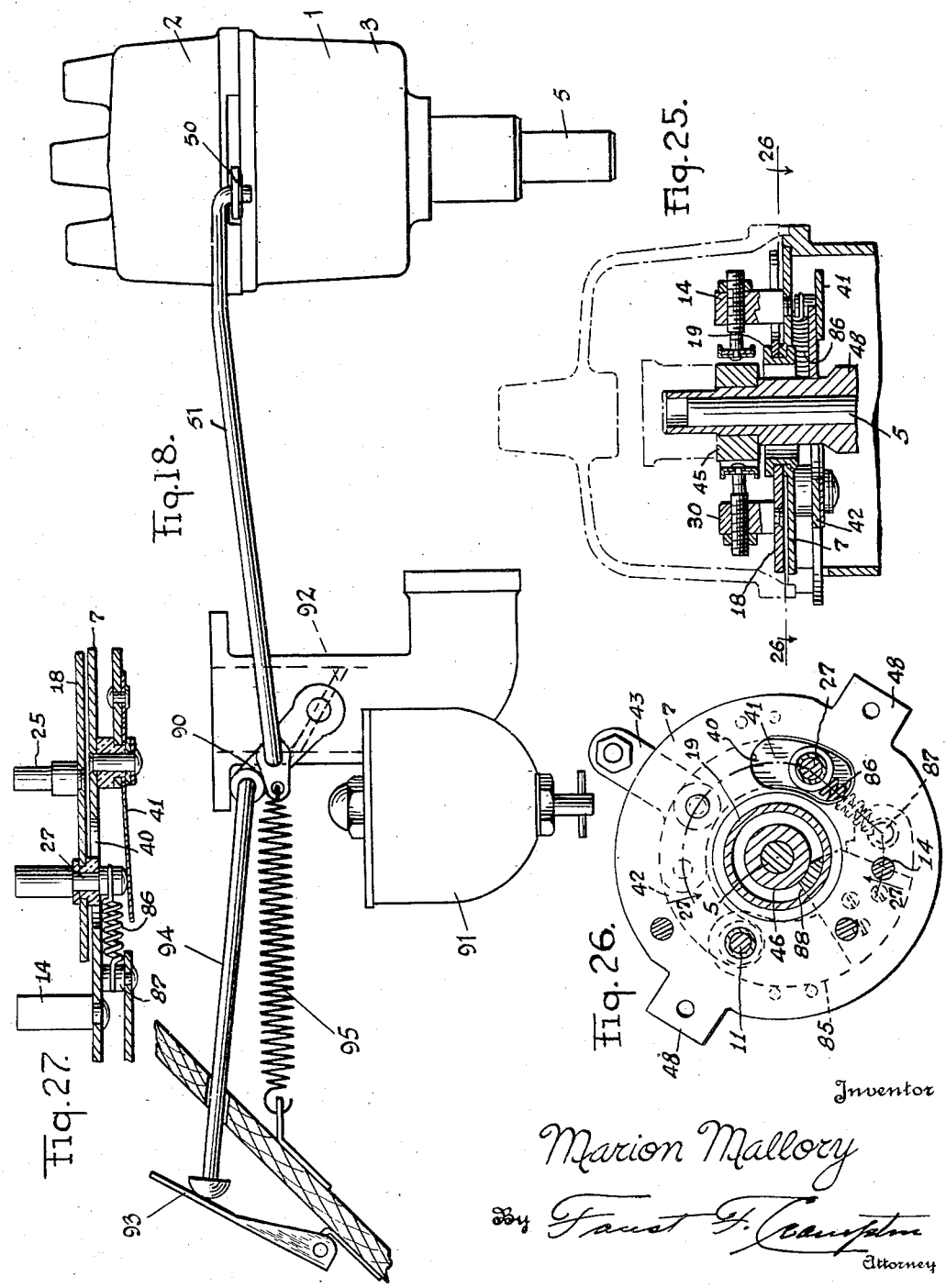
Figure 19:
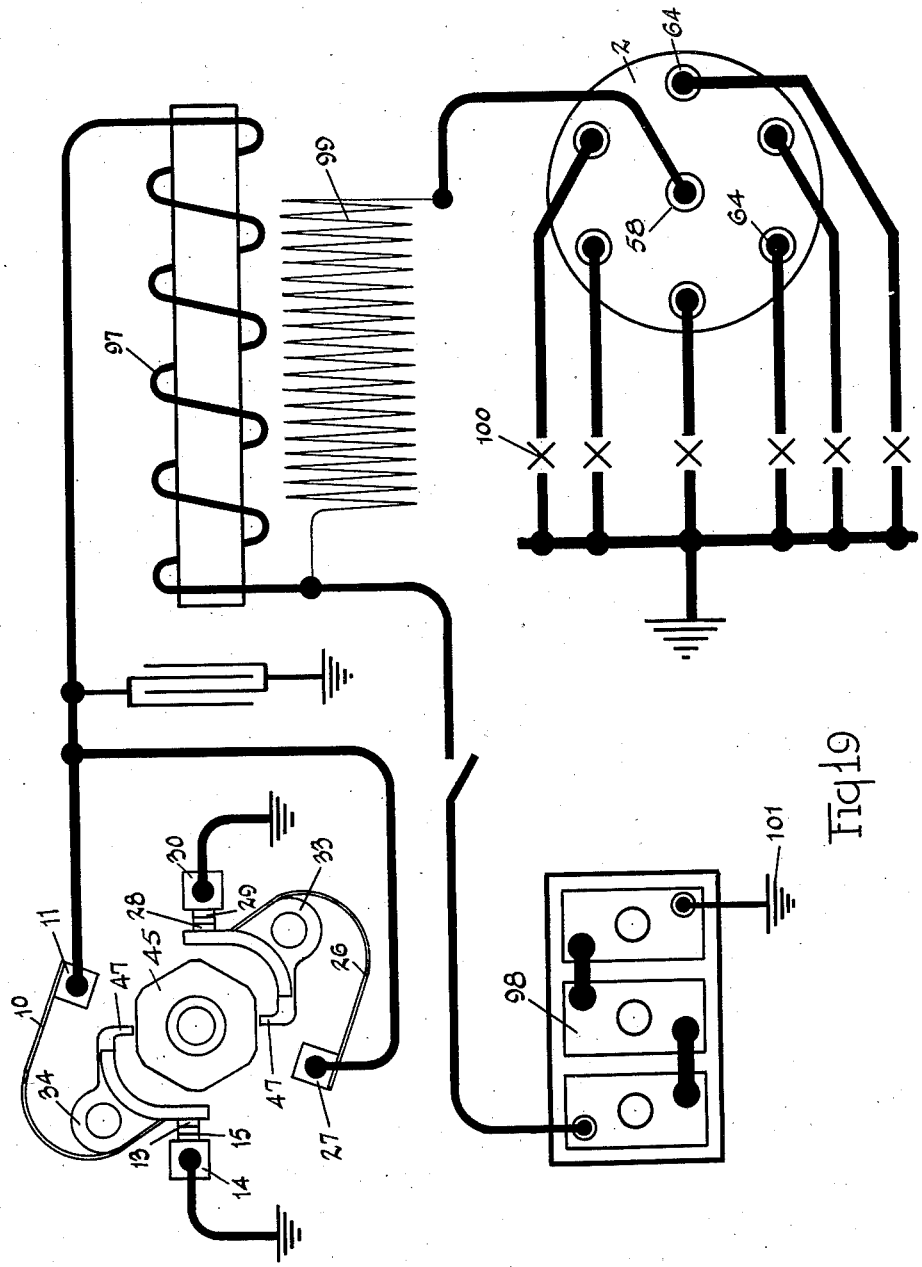

Fig. 1 is a view of a vertical section through the timer selected for purposes of illustration. Fig. 2 is a top view of the timer with the distributor parts removed. Figs. 1 and 2 illustrate the timer when parts thereof are in one operative position relative to each other. Fig. 3 is a diagrammatic illustration showing the closure periods of the primary of the ignition circuit when the parts are in the relative position shown in Figs. 1 and 2. Fig. 4 is a view of a vertical section and illustrates the parts of the timer in an operative position other than that shown in Fig. 1. Fig. 5 is a top view of the timer, the parts of the distributor being shown removed and when the parts are in the position shown in Fig. 4. Fig. 6 is a diagrammatic illustration showing extended circuit closure periods produced by the change in the relative position of the parts shown in Figs. 4 and 5 and from that shown in Figs. 1 and 2. Fig. 7 is a bottom view of the contact supporting plate. Fig. 8 is a top view of a circuit closer actuating member. Fig. 9 is a side view of the member illustrated in Fig. 8. Fig. 10 is a sectional view of the member shown in Fig. 8. Fig. 11 indicates diagrammatically the variations in the advance of the ignition times that may be brought about by the substitution of parts that are actuated by the governor. Fig. 12 is a top view of the centrifugally operated governor mechanism, and particularly illustrates a means which, though actuated by the movement of the centrifugally operated part of the mechanism, controls the termination of the closure period independent of the extent of movement of the centrifugally operated part of the governor. Fig. 13 illustrates one part of the centrifugally operated governor mechanism when in one position. Fig. 14 illustrates the mechanism shown in Fig. 13 when advanced to another position. Fig. 15 illustrates the element for controlling the termination of the circuit closure periods independent of the extent of movement of the centrifugally operated part of the governor. Fig. 16 illustrates a modification of the circuit controllers shown in Figs. 12 and 15 and provides for the movement of the circuit closer mechanism different from that of the controllers shown in Figs. 13 and 15. Fig. 17 illustrates a fourth modification of the controller and operates to control the termination closure periods in a manner different from that of the circuit closure period controllers shown in Figs. 12, 15, and 16. Fig. 18 illustrates the mechanical connection as between the throttle of the engine and the timer whereby throttle opening and increase of closure periods are produced by outward movement of the accelerator. Fig. 19 is a diagram of the connections of the timer with the other parts of the ignition system. Fig. 20 is a top view of a modified form of governor. Fig. 21 is a top view, similar to Fig. 20, except that certain parts have been removed. Fig. 22 is a view of a section taken on the plane of the line 22—22 indicated in Fig. 20. Fig. 23 is a top view of the governor wherein certain of the parts have been changed to adapt the governor for rotation in a direction counter to the rotation of the form of governor illustrated in Fig. 20. Fig. 24 is a plan view similar to Fig. 2, but with the housing omitted and some of the concealed parts indicated by dotted lines. Fig. 25 is a section taken on the line 25—25 of Fig. 24. Fig. 26 is a section taken on the line 26—26 of Fig. 25. Fig. 27 is a section taken on the line 27—27 of Fig. 26.

The ignition timer comprises a two part shell 1. The upper part 2 of the shell is formed of insulating material and contains the circuit closing mechanism of the primary circuit and also of the secondary circuit, by means of which the primary circuit is completed for the required period of time in order to enable the building up of the necessary field to produce the proper ignitable flame at the terminals of the spark plugs, and for connecting the spark plugs in the desired sequence in the secondary of the induction coil to produce the ignition in the required circuit of the engine at the termination of the sequential closure periods of the primary circuit.

The lower part 3 of the shell 1 contains the governor and the centrifugally operated mechanism which operates to advance or retard the closure period and consequently operates to advance or retard the times at which the primary circuit is broken.

The shell 1 surrounds the upper end of the shaft 5, to which the governor mechanism is connected and which operates the circuit closers for closing and opening the circuit of the primary of the induction coil and also the circuit closer for completing the circuit of the secondary coil to the spark plugs.

A plate 7 is supported on the upper edge of the part 3 of the shell 1. A post 8 is connected to the plate 7. An L-shaped insulating block 9 is supported for angular movements on the post 8. A spring 10 is connected to the L-shaped block 9 and to a post 11 also supported on the plate 7. The post 11 is provided with a suitable insulating sleeve that extends through the plate 7 to insulate the post 11 from the plate 7. The connection of the spring 10 with the post 11 and the L-shaped block 9 is such as to cause one arm of the L-shaped block to move inwardly with respect to the center of the plate 7. The other arm of the L-shaped block 9 is provided with a contact 13. A post 14 is also mounted on the plate 7 and is provided with a fixed contact 15 that coacts with the movable contact 13 on the L-shaped block 9 to close and open a circuit through the post 11 and the spring 10.

A movable plate 18, substantially semicircular in form, is supported on the plate 7 for short angular movements. The plate 7 is provided with a relatively large central opening and the plate 18 has an opening that registers therewith and the two are rotatably connected together by means of the ring 19 having flanged portions that overlap the edge portions of the openings in the said plates 7 and 18. The movement of the plate 18 relative to the plate 7 is limited by pins 20 that are threaded into the plate 7 and extend through slots 21 formed in the plate 18.

A circuit closer is also mounted on the plate 18. It comprises a block 24 of insulating material which is supported for angular movements on the post 25 which is secured to the plate 18. The block 24 is of insulating material and is substantially L-shaped. It is constructed substantially the same as the L-shaped block 9. It is spring pressed to press one of its arms inwardly with respect to the center of the plate 7 by means of the spring 26 which is connected to one end to the block 24 and at the other end to the post 27 which is secured to the plate 18. One of the arms of the block 24 is provided with a movable contact 28 and a fixed contact 29 is adjustably secured in the post 30 which is also supported and connected to the plate 18. Thus the circuit closer 33, formed by the contacts 28 and 29 and their associated parts, is adjustable in its relation about the center of the plate 7 to the circuit closer 34, which consists of the contacts 13 and 15 and their associated parts.

The L-shaped blocks 9 and 24, preferably, each have one arm formed of metal, such as the sheet metal part 38 shown in Fig. 10. The sheet metal part 38 is made in the form of a channel and so that it will overlap the upper and lower edge portions of the blocks 9 and 24, and is provided with portions 39 that are embedded in the insulating material of which the blocks 9 and 24 are formed. The springs 10 are then connected by spot welding or by other suitable means to the arms 38 of the blocks 9 and 24.

The post 27 is also insulatingly supported on the plate 18 by means of a suitable insulating sleeve. It extends through a slot 40 (Figs. 7, 26 and 27) formed in the plate 7 and so as to make contact with the spring contact 41 which is insulatingly supported by means of a bridge 42 which is connected to the post 11 and is thereby insulatingly supported from the plate 7. The bridge 42 is provided with an arm 43 which protrudes beyond the edge of the shell 1, to which may be connected, if desired, a condenser of the type commonly used in connection with ignition systems.

A cam 45 is located on the upper end of the shaft 5. The cam 45 is secured to, or formed integral with, a sleeve 46 that is angularly movable on the upper end of the shaft 5. Means is provided for connecting the sleeve 46 with the shaft 5 and also for moving it angularly with respect to the shaft 5 to advance or retard its position relative to the direction of rotation of the shaft 5. The cam 45 is provided with as many points as there are cylinders in the engine. The cam operates to move the L-shaped blocks 9 and 24 by engaging the fingers 47 formed on the blocks to open the contacts 13 and 15 and the contacts 28 and 29, that is, to operate the circuit closers 33 and 34. The points of the cam are rounded to prevent bouncing of the circuit closers and to obtain the smooth operation and accurate response of the circuit closers to the movement of the cam.

The inner diameter of the ring 19 is sufficiently large to receive the cam 45 and so that when the cam has been placed in position on the shaft 5, the plate 7 may be placed over the cam and in position for the latter to engage the ends of the fingers 47 of the circuit closers 33 and 34. The plate 7 may then be secured in position, by means of the ears 48 and the screws 49, to the part 3 of the shell 1. Movement of the plate 18 will thus move the circuit closer 33 with respect to the circuit closer 34 and increase the length of the periods in which the circuit is closed by reason of the fact that the two circuit closers are connected in parallel in the primary circuit. In order to facilitate movement of the plate 18, the plate 18 is provided with an arm 50 that may be operated manually by means of the link 51 to shift the circuit closer 33 relative to the cam to produce earlier opening and consequently earlier closing of the circuit closer 33 and extend the closure periods of the two circuit closers, as illustrated in Figs. 3 and 6.

Fig. 3 indicates by the black portions 52 of the ring shown therein, the closure periods when the plate 18 and the circuit closer 33 is in the position shown in Fig. 2. While in Fig. 6 the black portions 53 illustrate the closure periods of the circuit closer 33 and the black portions 54 indicate the closure periods of the circuit closer 34 which overlap and, consequently, extend the length of the closure period of the primary circuit. Movement of the plate 18 to the position indicated in Fig. 5 illustrates the extent of the closure period that is obtained by such movement. Since the circuit closers are connected in parallel in the primary circuit, the current will flow through the primary coil, during the periods indicated in Figs. 3 and 6 and all intermediate periods according to the position of the arm 50, and during which the flux may be built up in the secondary coil in advance of the termination of the closure period, namely, the times in the cycle of the engine in which the ignitions take place. The circuit to the circuit closers is through the bridge 42 and the posts 11 and 27, the springs 10 and 26, the movable contacts 13 and 28 to the fixed contacts 29 and 15. The bridge is connected to the primary coil and the primary coil is connected to the source of supply.

The secondary circuit is completed through the post 58 to the contact 59 and the spring pressed contact 60. An insulating sleeve or cap 61 is located on the upper end of the sleeve 46 and is provided with a contact 62 that is connected to the spring contact 60. It moves in proximity to the fixed contacts 63 arranged around the center of the upper part 2 of the shell 1, whereby short gaps are sequentially formed with the contacts 62. The binding post 58 is connected with the secondary coil of the induction coil and the contacts 63 are connected to the binding posts 64 which are connected to the spark plugs of the engine, whereby the ignition is produced in proper sequence in the cylinders of the engine and at times in its cycle of operation as controlled by the cam 45 operating in conjunction with the circuit closers. The control is brought about by adjusting the position of the cam 45 relative to the shaft 5 to vary the times of the ignition in the cycle of the engine and by adjusting the circuit closer 33, relative to the circuit closer 34, to vary the lengths of the closure periods.

Movement of the cam 45, relative to the shaft 5, is automatically obtained by means of a governor 66 which is connected to the cam 45 through the sleeve 46 and the plate 67. The plate 67 is removably and adjustably connected and consequently may be inverted for reverse movements of the cam. The centrifugally operated mechanism of the governor is removably connected to the shaft 5 by means of the plate 68 on which the parts of the mechanism are supported and thus may be inverted. A pair of weights 69, are pivotally supported on the plate 68 by the pivot pins 70. The axes of the pins 70 are located in the plane of the axis of the shaft 5. The weights are located on the opposite sides of the plate 68 and each of the weights is spring pressed by means of the flat spring 71 which is secured to the plate 68 by means of a bracket 72. The end of each flat spring 71 is pressed against the sector shaped weight at a point near a curved corner or part, as at 73, the contacting portion of the spring 71 being substantially tangential to the curvature of the corner 73 substantially as shown in Fig. 13, when the weight and the spring are in their normal positions. When, however, by the movement of the shaft 5, the centrifugal force operates to throw the center of gravity of each weight outward from the axis of the shaft 5, the weight in each case turns on its pivot pin 70 and the corner 73 slides along the spring 71 and reduces the effective length of the spring and thereby increases the pressure of the spring, not only by reason of the deflection of its end, but also by reason of the shortening of its effective length. The distortion per unit length of the spring, consequently, is proportionately greater than the centrifugal force, that moves the weights 69 against the pressure of the spring. As is well known in connection with centrifugally operated mechanisms, the centrifugal force increases substantially in proportion to the square of the radii of rotation of the centers of gravity of the masses that constitute the centrifugally operated part of the mechanism of governors. By the construction described, the centrifugal force which is increased by the outward movement, is increasingly counteracted by the increased pressure of the spring.

The plane of the pins 70 and the shaft 5 is such as to locate a large proportion of the mass of the weights on one side of the plane and a larger proportion of the mass of the weights on the opposite side of the plane. Substantially one-quarter of the mass of each weight is located on the side of the plane that the spring 71 is located on and, consequently, as the mass moves about the pin, it causes the center gravity of the weight to approach the plane of the pins and the shaft 5. This decreases the effective counter pressure of the weights against the springs 71, although the centrifugal force of the mass increases and, although the centrifugal force created by the rotation of the weights increases disproportionately to the increase of the speed in rotation, yet the actual movement of the weights is substantially proportionate to the speed of rotation.

The movements of the weights are limited by any suitable means. In the form of construction shown, the plate 68 is provided with a pair of arcuate slots 75 and each of the weights 69 is provided with a pair of arms 76. A pin 77 extends through each of the pairs of arms 76 and into a slot 75. The arcuate center of each slot 75 is in one of the pins 70 and, consequently, the pin 77 and its associated slot 75 limit the angular movements of the weight 69. It is within this angular movement that the cam 45 is advanced or retarded as may be desired, its advancement, however, being controlled according to the characteristics of the particular engine with which the timer is used to obtain the most efficient operations of the engine.

The desired changes in the angular movement of the cam 45, relative to the shaft 5, due to the movement of the centrifugal mechanism of the governor, are obtained according to the character of the means interconnecting the cam 45 and the centrifugal mechanism of the governor. In the particular form of construction shown, the movement of the weight 69 is transmitted through the cam plate 67 and consequently the changes in the movement of the cam 45, in response to the movement of the centrifugally operated mechanism of the governor, may be altered as desired, dependent upon the nature of the connection between the governor and the plate. The plate 67 is provided for this purpose with a slot 80 and the weights 69 are provided with pins having the rollers 82. The pins 77 are extended and are used to support the rollers 82. The upper of the rollers that is supported on the upper of the weights, is located in the slot 80. As the pin 77 is moved, the plate 67 and the cam 45 will be angularly moved relative to the shaft 5. The movement of the cam 45, relative to the shaft 5, may be varied according to the shape of the slot 80. Thus, the slot 80 may be so formed that there will be no advance of the cam 45 until the speed of the shaft 5 rises to any desired point. If desired, this may be a relatively high speed; whereupon any further increase in speed will produce a very marked change in the position of the cam 45 relative to the shaft 5. Also, if desired, there may be a marked increase immediately upon the movement of the centrifugal mechanism of the governor and a lesser movement during the more advanced speeds of the engine, or, if desired, no movement of the cam 45 at the more advanced speeds, or there may be a gradual movement of the cam 45 exactly in proportion to the speed of the engine from one extreme to the other.

This is illustrated by the different forms of the slots 80 indicated in the Figures 12, 15, 16 and 17. In Fig. 12, the slot 80 is so formed that the cam 45 will be angularly moved relative to the shaft 5 according to the speed of the governor up to an extreme speed to produce an extreme advancement of the cam 45 of the engine. In the plate shown in Fig. 17, the slot 80 is so formed that the proportionate change of the cam 45 to the speed of the engine will be constant to substantially the limit of the speed of the engine but to a relatively small advancement of the cam 45 relative to the shaft 5. In the form of plate shown in Fig. 15, the cam 45 will produce a marked advancement relative to the shaft 5 at the lower speeds of the engine and thereafter the advancement relative to the speed of the engine will be greatly reduced, or substantially nil. When the plate, shown in Fig. 16, is used, there will be an increase in the angle to which the cam 45 is moved relative to the shaft 5, progressively from a low speed to an intermediate speed and thereafter there will be but little change or practically no change in the movement of the cam 45, notwithstanding the increase of the speed of the engine. According to the similarity of the slot 80 to the slot 75, the movement of the cam 45 will be lessened by any angular movement of the weights 69, and the slot 80 may be designed to obtain any desired and any variable ratio of movement of the cam 45 to the outward movements of the weights relative to the shaft.

The speeds and advancements obtainable by the slots 80 formed in the plates 67, shown in Figs. 12, 15, 16, and 17, are indicated in the diagram shown in Fig. 11, wherein the degrees of advance of the cam 45 are indicated vertically, while the revolutions of the motor are indicated horizontally. The changes produced by the plate 67, shown in Fig. 12, are indicated by the heavy line $a$, the changes producible by the plate 67, shown in Fig. 15, are indicated at $b$. The changes producible by the plate 67, illustrated in Fig. 16, are indicated at $c$, and the changes producible by the plate 67, illustrated in Fig. 17, are indicated at $d$.

The construction of the governor and the plate 18 is such that provision may be readily made for movement of the shaft 5 in different directions. In some engines the cam shaft 5 moves clockwise, and in other engines it moves counter-clockwise. In the latter case, to increase the closure periods of the circuit closers the plate 18 should be moved in a direction opposite to that indicated in Figure 2. In order to provide for the adaptation of the timer to any and all engines, the plate 7 is provided with two pairs of openings for the receipt of the threaded pins 20 to change the limitation of the movements of the plate 18 and enable it to be swung clockwise when it is desired to extend the closure period. Also, the plates 67 and 68 are so connected that by simply turning the plates over, and then securing them to the shaft 5, the cam 45 will be angularly moved in the direction opposite to that now indicated in the drawings. Thus the pin 77 of the lower weight 69, which now extends downwardly as shown in the drawings, may when the plate 68 is inverted, be inserted in the slot 80 of the cam plate 67 and cause movement of the cam 45 counter-clockwise instead of clockwise, the clockwise movement for advancement being indicated in Fig. 5.

In the operation of the timer and, assuming that the spark is advanced to a midpoint by the timer, and that the engine is running about thirty-five miles an hour, quick opening of the throttle would raise the compression in the engine, and cause knocking. This is avoided by causing the retardation of the spark slightly in advance of the high compression produced thereby. After the engine has picked up the desired speed and the throttle is moved towards its closed position to prevent an increase of speed over the desired speed, the relative position of the cam on the shaft is changed to advance the ignition time according to the increased speed. There is thus a momentary retardation of the ignition times until the throttle has been altered when the desired speed is reached, whereupon there is the restoration of the control of the automatic mechanism to produce the ignition at the desired time, according to the speed of the engine that has been attained by the opening of the throttle. As is well known, compression always lessens as the speed of the engine increases and, consequently, retardation of the ignition time in the cycle of the engine is not required at high speeds, but is desirable at intermediate and lower speeds.

In order to bring about immediate retardation of ignition times upon quick opening of the throttle, a friction brake lever 85 is pivotally supported on the post 11 at a point intermediate the plate 7 and the bridge 42, the post being separated from the lever 85 by a suitable insulating collar. A spring 86 is connected to a post 87 formed on the end of the clutch lever 85 and to the insulating sleeve around the post 27 so as to suspend the end of the spring intermediate the contact 41 and the plate 7. A clutch block 88, that may be formed of fibre, is located on the clutch lever 85 and projects inwardly from the lever to engage the surface of the sleeve 46, with the result that, when the engine is operating at low speed and the plate 18 is moved in the direction of the arrow indicated on the arm 50 in Fig. 2, the spring 86 will be stretched, thus increasing its tension and the rotation of the sleeve under the influence of the centrifugal governor will be materially retarded until the speed of the engine has increased, with the result that instantly the cam 45 will be retarded. This will be accomplished notwithstanding the fact that the centrifugal mechanism has advanced the cam to the position that it had in advance of such movement of the plate 18. Not only is the cam 45 retarded and, consequently, not only is the ignition time, in the cycle of the operations of the engine, retarded, but also the closure period is increased, which enables the primary circuit to build up the magnetic flux through the secondary coil of the induction coil to the maximum. This produces an exceedingly hot spark in the fuel charged cylinders and at a time when there is produced a high compression. There is thus produced a retardation of ignition times and an increase in the closure periods in advance of the rise of the compression of the engine. When the speed of the engine builds up, the governor mechanism builds up an increased centrifugal force which advances the cam as the low compression is reached. Thus, increase in the length of the closure periods, retardation and high compression of the engine occurs substantially simultaneously at various speeds of the engine. However, at high speeds, the brake will not take hold and the spark will not be retarded by quick further opening of the throttle. This is exactly what is desired, because under such conditions there will not be a sufficient increase in compression to cause knocking.

As shown in Fig. 18, the arm 50 of the plate 18 is connected by means of the link 51 to the throttle lever 90 of the carburetor 91. The throttle lever 90 operates the throttle 92. The accelerator lever, or pedal lever, 93, operates the throttle lever 90 and the plate 18 by means of the link 94 that may be connected to the pedal lever 93 or may be pressed against the pedal lever 93 by means of the spring 95. Any suitable connection may be used for interconnecting these parts, the object being to move the plate 18 with the throttle valve 92. Thus, the plate 18 is moved to increase the circuit closure periods when the throttle valve 92 is opened and to operate the brake lever 85 to retard the ignition times in the cycle of the operations of the engine, as described heretofore.

The brake 88 also serves another function. Each time the cam 45 operates the circuit breaker, the pressure of the latter against the cam is in opposition to the action of the governor and tends to retard the rotation of the cam 45 and sleeve 46, while the shaft 5 continues to rotate normally. This tends to cause a back lash between the plates 67 and the governor, which, in the absence of any correcting means, often results in a very noisy operation. The tension of the spring 86, however, is always sufficient to cause the brake 88 to bear against the sleeve 46 with sufficient friction to prevent such back lash and to insure a practically noiseless operation of the timer.

The electric connections of the distributer in the ignition system are shown in Fig. 19, wherein the circuit closers 33 and 34 are connected in parallel to each other and jointly in series with the primary coil 97. The battery 98 affords a supply of current to the primary and the circuit closers 33 and 34. The secondary 99 is connected to the central post 58 of the distributer and the spark plugs 100 are connected to the posts 64. The circuits of the primary and the secondary are completed through the ground 101, or frame of the automobile.

The reversibility of the plates 67 and 68 is shown in the form of construction illustrated in Figs. 20 and 23. The cam 45 is also adjustably connected to the plate 67 as shown in Figs. 20 and 22 in order to obtain proper adjustment of the initial position of the cam points of the cam 45, with reference to the circuit closers and particularly with reference to the fingers 47 of the circuit closers. The sleeve 46 is provided with a flange 110 which may be clamped between the plate 67 and a diamond shaped plate 111 by means of the screws 112 which are threaded into the plate 67. This will secure the plate 67 to the sleeve 46 and, consequently, the cam 45 to the plate 67 in any desired adjustable relation. Heretofore in order to provide for circumferential adjustment of the cam, it has been customary to clamp it to the sleeve by means of a lock nut and it has been very difficult to secure the proper adjustment. In the present construction, however, it should be noted that the cam is formed integral with the sleeve 46 and the connection between the sleeve and the cam plate 67 may be easily and accurately adjusted.

The shaft 5 is provided with an enlarged portion which is threaded as at 115. The portion 115 may be flattened as at 116 for the purpose of securing the plate 68 as against rotation relative to the shaft, the plate 68 being provided with an oblong hole 117 as shown in Fig. 21. A nut 118 may be secured onto the threaded portion 115 to clamp the plate 68 against the shoulder 119 formed by a third enlarged portion 120 of the shaft 5. Thus the plates 67 and 68 may be readily removed from the shaft 5 and inverted in order to provide for operation and connection of the governor mechanism with the cam 45 for movement of the shaft 5, either clockwise or counter-clockwise, by the operation of the engine.

Also, if desired, the weights 73 may be provided with the rollers 122 against which the springs 71 are pressed. This reduces the frictional resistance to the responsive movement of the weights in the operation of the governor mechanism.

I claim:

1. An engine ignition timer having a governor for controlling the times of ignition comprising a plurality of weights, a rotatable member for pivotally supporting and rotating the weights about the axis of the member, a means for resisting the outward movements of the weights, a circuit closer, a cam for operating the circuit closer, a cam connected to the first named cam and connected to the weights for shifting the first named cam relative to the member according to the movement of the weights and the configuration of the second named cam, and means for initially adjusting the second named cam circumferentially about the axis of the first named cam.

2. An engine ignition timer having a governor for controlling the times of ignition comprising a plurality of weights, a rotatable member for pivotally supporting and rotating the weights about the axis of the member, a circuit closer, a cam connected to the member for operating the circuit closer and connected to the weights for shifting the cam relative to the member, and means for retarding the rotation of the cam as the throttle is opened, until the speed of the engine increases in response to the increase of fuel.

3. An engine ignition timer having a governor for controlling the times of ignition comprising a plurality of weights, a rotatable member for pivotally supporting and rotating the weights about the axis of the member, a circuit closer, a cam connected to the member for operating the circuit closer and connected to the weights for shifting the cam relative to the member, and friction means for retarding the action of said cam and the consequent advance of the spark.

4. An engine ignition timer having a governor for controlling the times of ignition comprising a plurality of weights, a rotatable member for pivotally supporting and rotating the weights about the axis of the member, a means for increasingly resisting the movements of the weights by a pressure proportionately greater than the outward movement of the centers of gravity of the weights relative to the axis of the member, a circuit closer, a cam connected to the member for operating the circuit closer and connected to the weights for shifting the cam relative to the member, means for retarding the movement of the cam relative to the member and in combination with the throttle valve of the carburetor of the engine, the last named means connected to the throttle valve of the engine and operated therewith.

5. In an ignition timer, a governor having weights, a shaft, a plate invertably connected to the shaft and pivotally supporting the weights in proximity to the shaft and on opposite sides of the plate, means for resisting the movement of the weights relative to the shaft, a cam rotatably supported on the shaft, and means interconnecting the cam and one or the other of the weights for shifting the cam relative to the shaft according to the movement of the weights relative to the shaft, a circuit closer operated by the cam.

6. In an ignition timer, a governor having weights, a shaft, a plate invertably connected to the shaft and pivotally supporting the weights in proximity to the shaft and on opposite sides of the plate, means for increasingly resisting the movement of the weights relative to the shaft, a cam rotatably supported on the shaft, a plate having a cam operated by the outward movements of the weights for shifting the cam relative to the shaft, the second named plate invertably connected to the first named cam, a circuit closer operated by the first named cam to vary the time of opening its contacts according to the speed of the shaft.

7. In an ignition timer, a governor having weights, a shaft, a plate connected to the shaft and pivotally supporting the weights in proximity to the shaft, springs connected to the plate and engaging the weights to increasingly resist the movement of the weights relative to the shaft by a pressure proportionately greater than the relative movements of the weights from the shaft, a cam rotatably supported on the shaft, means interconnecting the cam and one of the weights for shifting the cam relative to the shaft according to the movement of the weights relative to the shaft, a circuit closer operated by the cam to vary the time of opening its contacts according to the speed of the shaft, and means for retarding the movement of the cam relative to the shaft.

8. In an ignition timer, a governor having weights, a shaft, a plate connected to the shaft and pivotally supporting the weights in proximity to the shaft, springs connected to the plate and engaging the weights to increasingly resist the movement of the weights relative to the shaft by a pressure proportionately greater than the relative movements of the weights from the shaft, a cam rotatably supported on the shaft, means interconnecting the cam and one of the weights for shifting the cam relative to the shaft according to the movement of the weights relative to the shaft, a circuit closing means operated by the cam, and means for varying the length of the circuit closed periods of the circuit closing means.

9. In an ignition timer, a governor having weights, a shaft, a plate connected to the shaft and pivotally supporting the weights in proximity to the shaft, springs connected to the plate and engaging the weights to increasingly resist the movement of the weights relative to the shaft by a pressure proportionately greater than the relative movements of the weights from the shaft, a cam rotatably supported on the shaft, means interconnecting the cam and one of the weights for shifting the cam relative to the shaft according to the movement of the weights relative to the shaft, a circuit closing means operated by the cam, means for varying the length of the circuit closed periods of the circuit closing means, and means for retarding the movement of the cam relative to the shaft when the length of the circuit closed periods is increased.

10. An ignition timer comprising a rotatable shaft, a cam shiftable with respect to the shaft to vary the times of ignition, a brake operable to retard said cam, and means connected with the throttle to increase the action of said brake as the throttle is opened.

11. An ignition timer comprising a speed responsive device to vary the times of ignition, and a brake operable in conjunction with the opening of the throttle to retard the timing in advance of increased engine compression.

12. An ignition timer comprising a speed responsive device to advance or retard the spark, and a brake operable in conjunction with the opening of the throttle to retard the spark until the engine speed has increased sufficiently to substantially overcome the increase in engine compression.

13. An ignition timer comprising a rotatable shaft, a cam shiftable with respect to said shaft to vary the timing of the ignition, a brake operable to retard the movement of said cam, means connected with the throttle to increase the action of said brake as the throttle is opened, and means for increasing the circumferential length of the circuit closure period as the throttle is opened.

14. An ignition timer comprising a speed responsive device to vary the timing of the ignition, a brake operable in conjunction with the opening of the throttle to retard the timing in advance of increased engine compression, and means for increasing the circumferential length of the circuit closure period as the throttle is opened.

15. An ignition timer comprising a speed responsive device to vary the timing of the ignition, a brake operable in conjunction with the opening of the throttle to retard the timing until the engine speed has increased sufficiently to substantially overcome the increase in engine compression, and means for increasing the circumferential length of the circuit closure period as the throttle is opened.

16. An ignition timer comprising a rotatable shaft, a cam normally rotatable with the shaft but capable of a limited relative circumferential movement with relation thereto, a governor for controlling said relative circumferential movement, and a brake having a fixed support and exerting a braking action on the cam.

17. An ignition timer comprising a timer shaft, a cam carried thereby and having a limited relative circumferential movement with relation thereto, a centrifugal governor for advancing the relative position of the cam in response to an increase in the speed of rotation of the timer shaft, and a brake having a fixed support and exerting a force resisting such advance.

18. In an ignition timer, a timer shaft, a sleeve and circuit breaker cam having a limited circumferential movement on the shaft to regulate the timer, a governor, a cam member operatively associated with the governor, and clamping means for adjustably determining the normal initial position of said cam member with respect to said sleeve and circuit breaker cam.

19. In an ignition timer, a timer shaft, a sleeve having a circuit breaker cam formed integral therewith and having a limited circumferential movement on the shaft to regulate the timing, a cam plate centered on the sleeve and having a cam slot, a centrifugal governor operatively associated with said cam slot, and clamping means for securing said plate in the desired normal initial position circumferentially of said sleeve.

In witness whereof I have hereunto signed my name to this specification.

MARION MALLORY.